United States Patent Office 3,445,207
Patented May 20, 1969

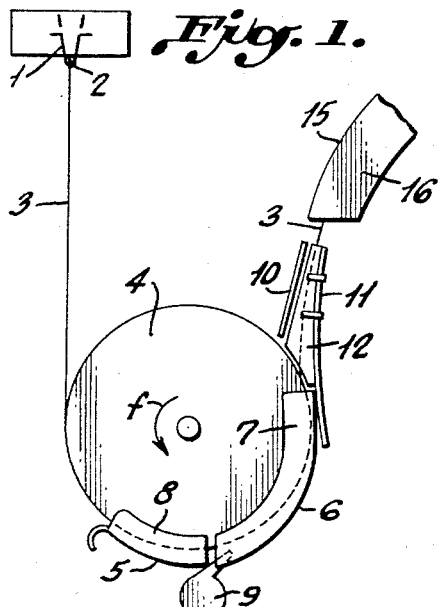
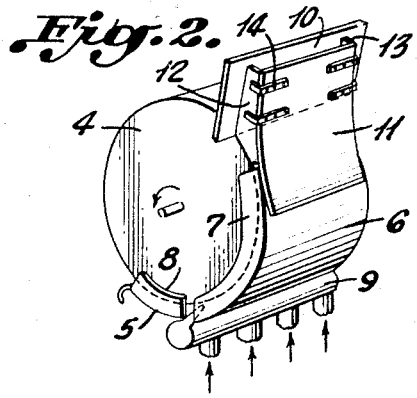
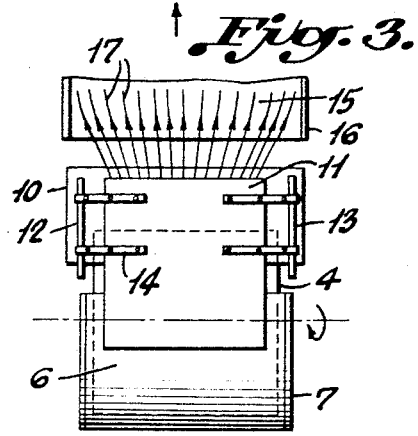
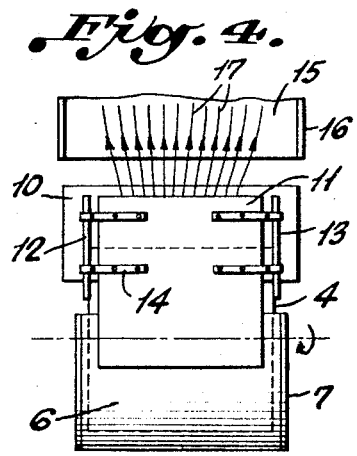
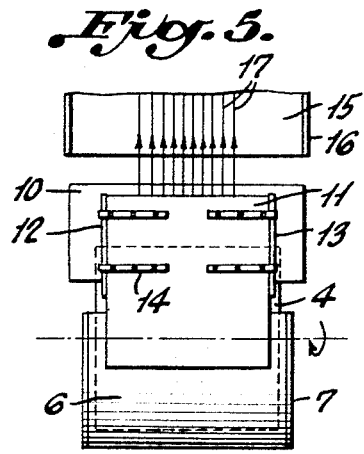
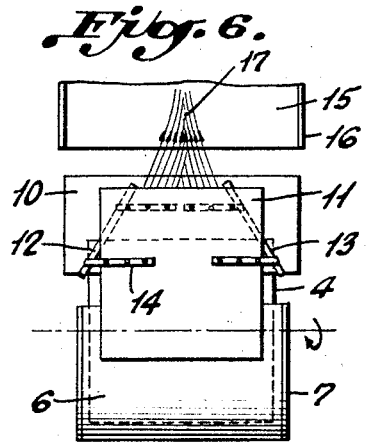

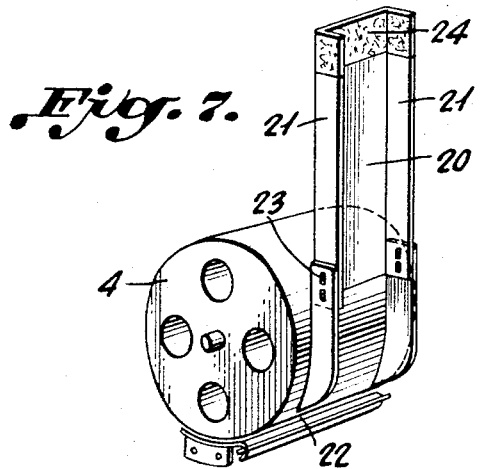
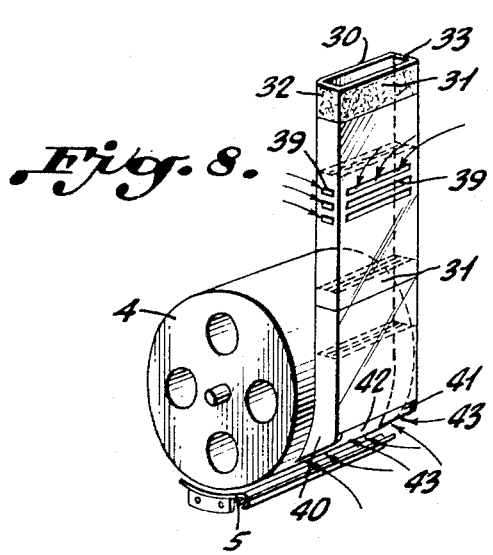
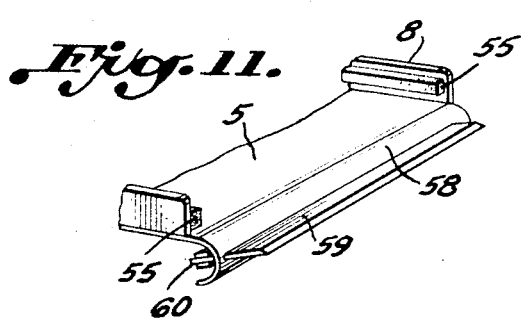
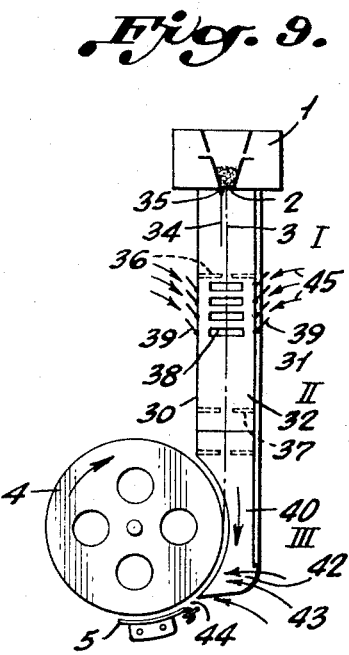
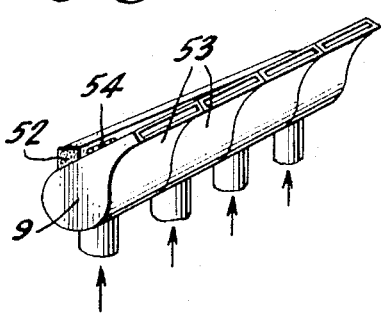

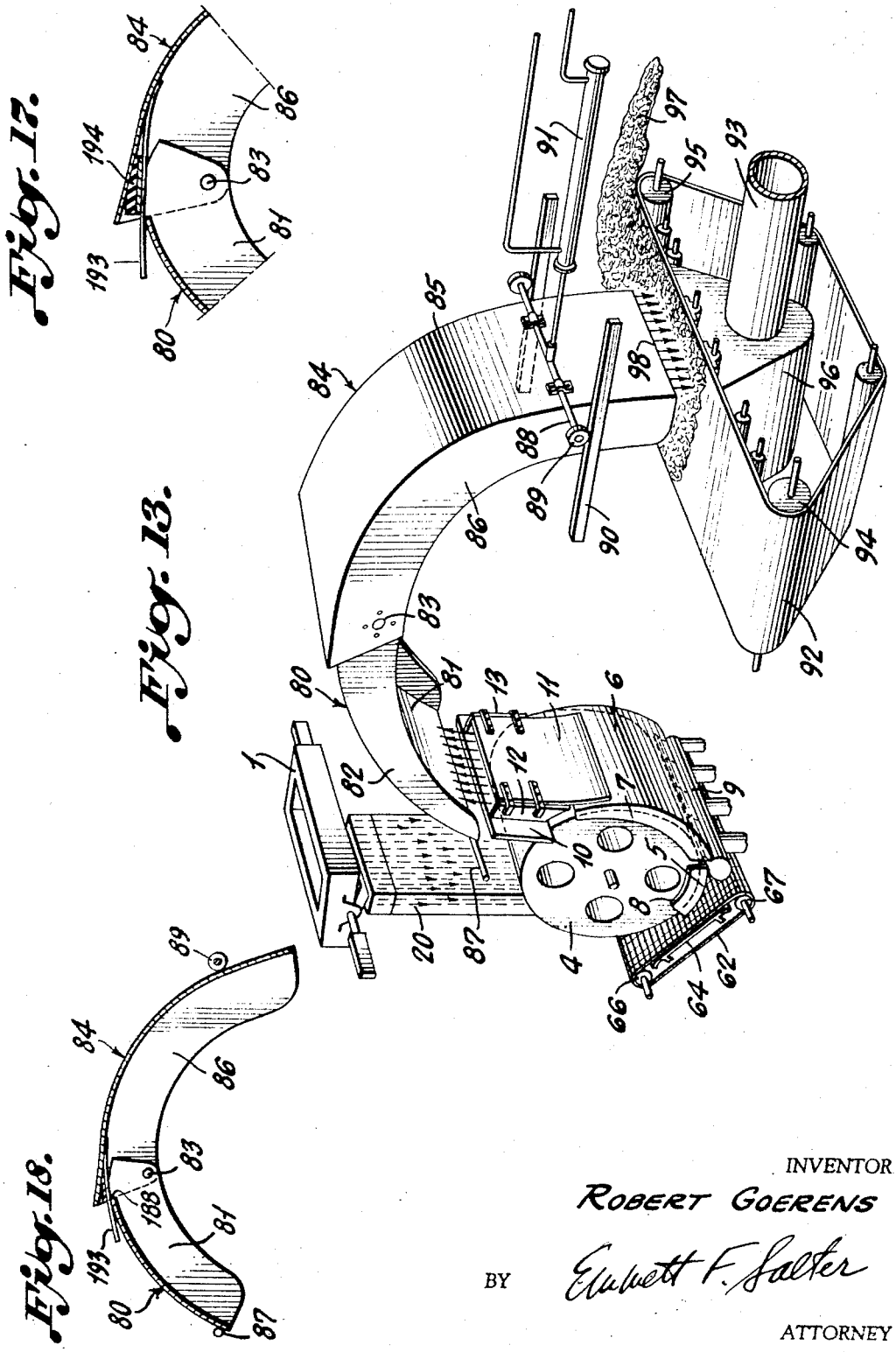

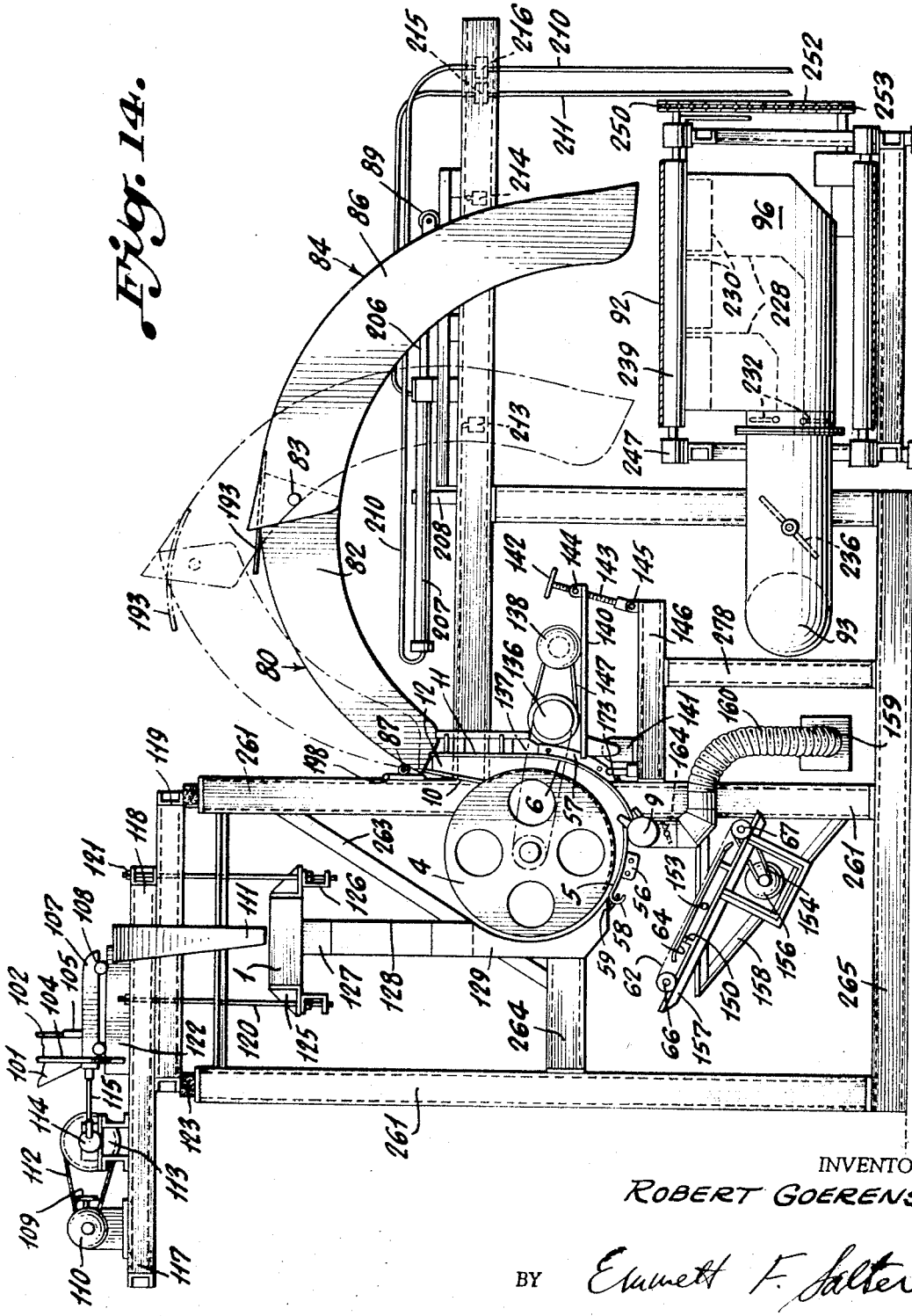

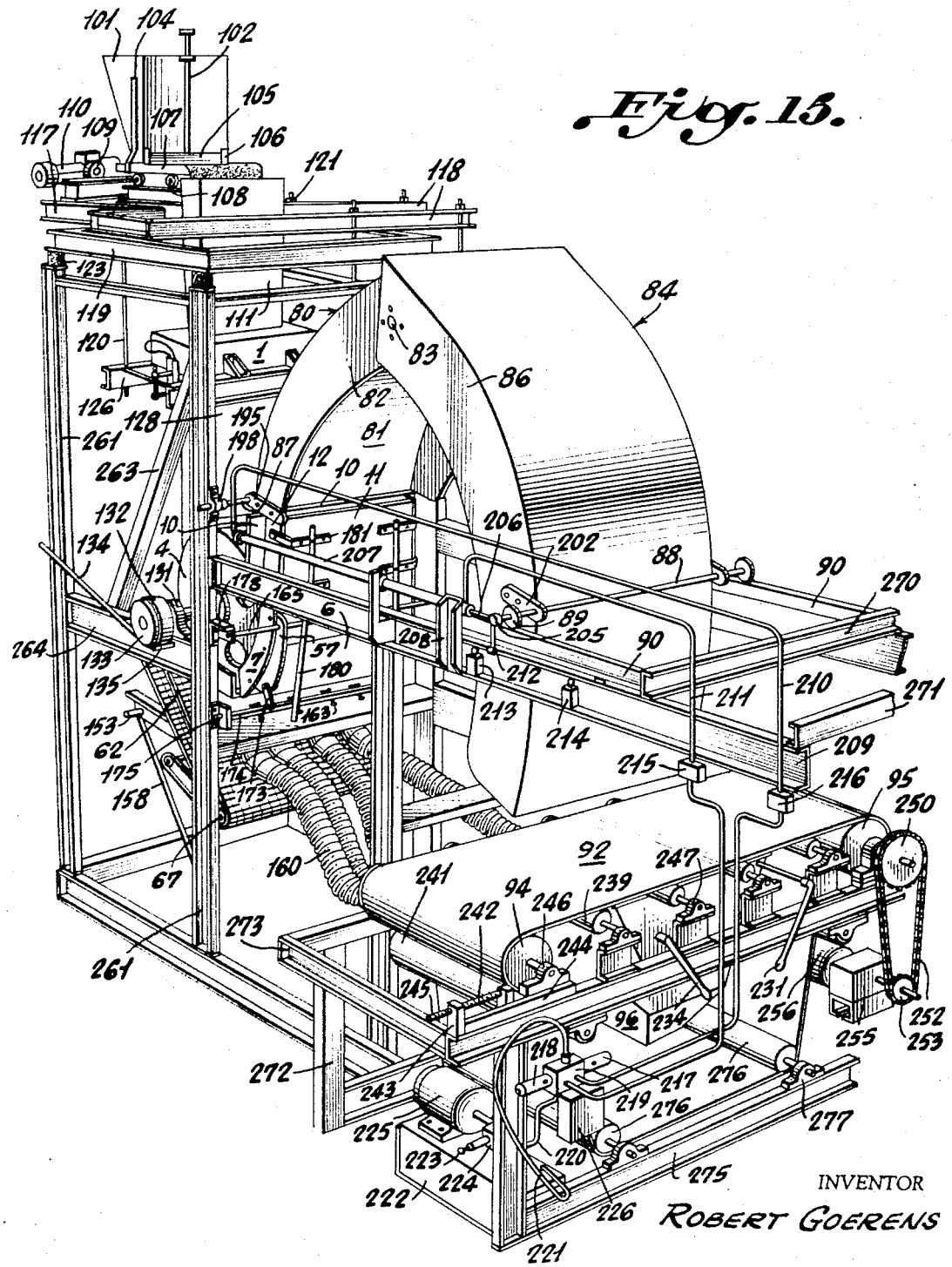

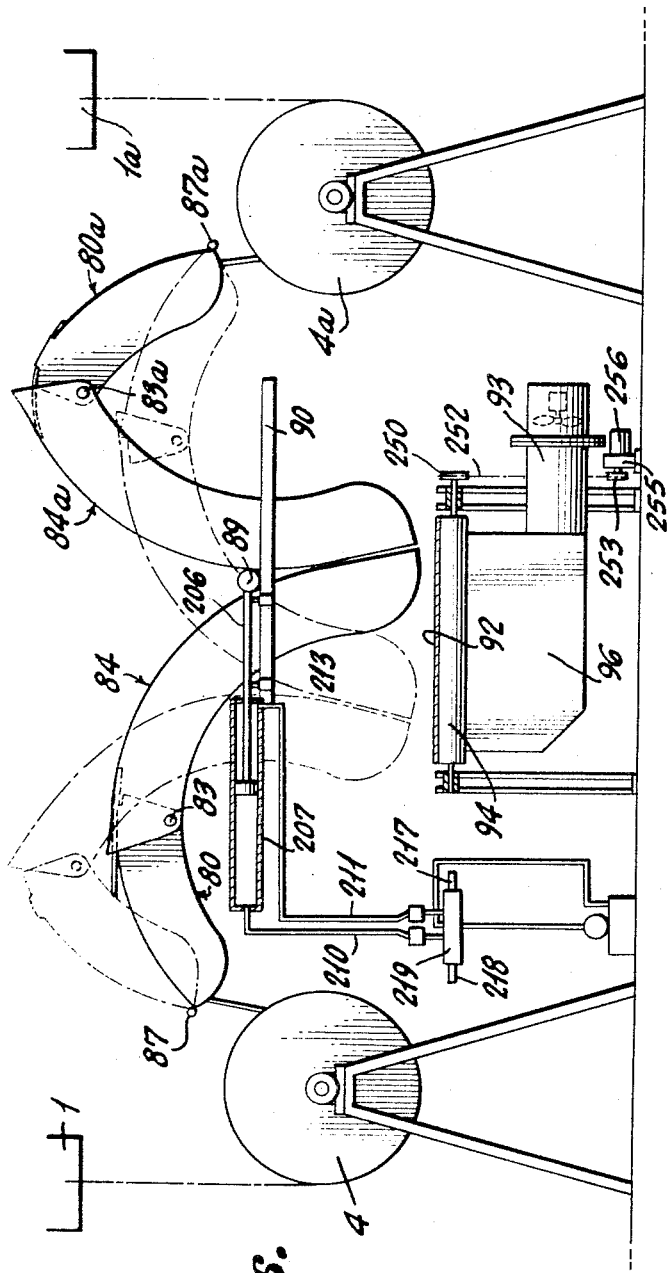
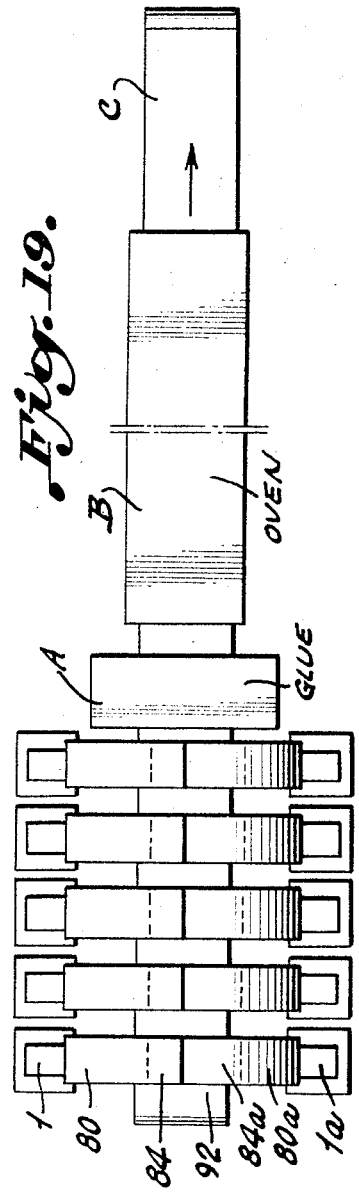

3,445,207
MANUFACTURE OF SHEETS OR WICKS FROM FIBERS OF THERMOPLASTIC MATERIAL SUCH AS GLASS FIBERS
Robert Goerens, Etten-Leur, Netherlands, assignor to Compagnie de Saint-Gobain, Neuilly-sur-Seine, Hauts-de-Seine, France, a corporation of France
Filed Jan. 17, 1966, Ser. No. 521,063
Claims priority, application France, Jan. 21, 1965, 2,745
Int. Cl. C03b 37/10
U.S. Cl. 65—10                                    19 Claims

ABSTRACT OF THE DISCLOSURE

The formation of a ribbon of fibers of thermoplastic material for the production of a mat therefrom derived from a row of streams of molten material such as molten glass, issuing from spinning orifices, which streams solidify as they travel downwardly towards a drawing-out drum to which they are aspirated in substantially parallel relation by a reduced pressure at one radial sector of the drum and are drawn out by the rotation of the drum and a positive pressure exerted on the fibers at a subsequent sector thereof in the direction of rotation, preparatory to the removal of the fibers from the drum following the contact of the fibers with the drum for less than one revolution of the latter. The removal of the fibers from the drum in desired widths is effected by guide baffles in conjunction with the aerodynamic currents of air emanating from a duct spaced from the lateral surface of the drum for the portion of its periphery adjacent to said sectors whereat the above-mentioned suction and pressure effects are generated by a blower nozzle of special design. A pressure compensation chamber between the spinning orifices and the drum, and a special rectifying device for faulty filaments in proximity to the drawing-out drum, assure the entrainment thereby of substantially all of the filaments issuing from the orifices with proper physical characteristics to attain a ribbon of homogeneously attenuated fibers for ultimate transfer and depositing on a travelling support to form a fibrous mat of uniform characteristics.

The present invention relates to the manufacture of mats, sheets or wicks formed from fibers of thermoplastic materials, such as glass fibers. It relates particularly to the process of manufacture of sheets or wicks from threads or filaments of material which are obtained mainly through the passage of the material through spinning orifices or by fusion of rods or sticks. The filaments are drawn into fibers by means of a rotating drawing-out drum, which are detached from the drum after having been carried over a part of the periphery of the latter, wherefrom they are brought, for example, on a support, where they form a mat or sheet, or at a collecting point to form a wick.

It has been established, particularly in the case where spinning nozzles are utilized whose discharge orifices are very close together, which give rise to parallel filaments very close together on the drum, in consequence of the need for economizing on the precious metal of which the nozzles are formed, that very narrow ribbons are obtained whose fibers have the tendency to stick together, which results in non-homogeneous sheets or screens having holes in certain spots and accumulations of fibers in others. The screens, as well as the resultant mats or felts which are obtained, therefore lack uniformity, which presents a great disadvantage in their utilization.

A first object of the invention is to eliminate the disadvantages of known processes, and to obtain, in simple and economical fashion mats, screens or sheets having remarkably homogeneous distribution of the fibers constituting them.

According to one characteristic of the invention, the process for obtaining these screens and wicks consists in the successive steps of guiding the filaments of material into a zone under reduced pressure, in order to assure their coming in contact with the drawing-out drum, in next bringing them into a zone under pressure in order to apply them against the drum and to assure their entrainment by the latter for their drawing-out, in separating the fibers from the drum before they have made a complete turn on it, this separation being obtained through the action of a gaseous current having served to apply the fibers on the drum, and in regulating the width of the band formed by the parallel fibers by modifying the dimensions of the section of the passageway of said gaseous current which guides them outside the drum.

It is also the object of the invention to provide an arrangement for executing this process. The apparatus in accordance with the invention comprises guiding elements concentric with the drawing-out drum, forming a duct in conjunction with the periphery of the drum; a blowing nozzle creating a zone under lowered pressure in the upstream portion of the duct and a zone under pressure in the downstream portion thereof; a deflector at the exit of this duct toward the upper part of the drum in order to swerve the gaseous current and thereby detach the fibers from the drum; a counter-deflector as a continuation of the guiding elements and cooperating with the deflector in order to increase the velocity of the gas current; and dampers or shutters arranged laterally at the exit of the duct, the distance between these shutters being adjustable in order to vary the quantity of air escaping laterally from the deflector and the counter-deflector to permit a band of parallel fibers of desired size to be obtained.

Another object of the invention is to reduce considerably the disturbances which may occur in the air between the spinning orifices and the drawing-out drum, these disturbances acting on the filaments of material so that they cannot maintain their parallelism at the exit of the spinning orifices. In accordance with the invention, there is provided for this purpose a protective wall and lateral walls extending perpendicularly thereto between the orifices or teats of the drawing plate and the drum. The lateral walls extend as far as the entrance of the suction conduit.

According to another characteristic of the invention, there is provided between the teats or nozzles of the drawing plate and the entrance of the intake conduit, a vertical chamber comprising three zones arranged in tiers. The uppermost zone is a continuation of the outlet orifices of the spinning nozzle which is hermetically closed, the intermediate zone is provided with openings for the supply of air, and the lower zone is separated from the intermediate zone by a throttling baffle or choke.

This arrangement permits, in consequence of the compensations of aerodynamic pressures under the teats of the spinning nozzle, to make immovable the filaments of material which have broken, and which hang from the bead or drop of glass in formation. The result is that these broken filaments disappear by fusion, caused by radiation from the spinning nozzle. Otherwise these filaments, by reason of their extreme lightness, can be actuated by the very weak air currents to execute back-and-forth movements and come into contact with and break the adjoining filaments.

The entrance of air into the intermediate zone of the chamber is advantageously controlled by means of movable shutters or dampers.

Another object of the invention is to assure baiting or starting of the laying of the filaments of material in contact with the drawing-out drum. It is known that the material, such as glass, at the beginning leaves the teats of the spinning nozzle in the form of drops, each drop followed by a filament of material. In all known processes, the drop is not seized at the spot where it falls and is not subjected to enforced drawing-out without slipping until the thread comes in contact with the drum. It has already been proposed, for example, in order to effect starting, to provide a device comprising two covers or cloths making an angle between them, the first cloth carrying along the bead or drop of glass and speeding it up in order to bring it to a speed close to the peripheral speed of the drum, and the second cloth guiding the glass filament onto the drum. The bead which is hardened during the interval separates from the filament by breaking and is eliminated by the second cloth which carries it along. A disadvantage of this device is that the bead of glass is seized by points provided on the first cloth and these points are uncontrollable. The result is that instead of being carried along, the bead is frequently expelled laterally, which causes the filament not to be guided onto the drum, and its winding is therefore not started. In addition, when this device is utilized with the customary speeds of drawing-out which are relatively high or about 40 m./sec., the bead makes contact so violently with the second cloth, that instead of being carried along by it, it is expelled from it in unconrtolled directions. It may bounce back against the drum and damage the filaments which are there, or it may not lead the fialment which it entrains, to the drum.

In accordance with the invention, the bead entraining the filament is seized by a bead-collecting cloth at the center of gravity of the bead, this cloth carrying along said bead towards the drawing-out drum while assuring the contacting of the filament with the drum. The bead is then projected away from the cloth together with the adjacent part, which is cut from the part of the filament which has been directed to the drum for starting.

A device according to the invention for executing this mode of operation comprises a movable cloth with bars receiving the beads of material and a stationary plate placed under said bars with which the lower parts of the beads come into contact. The bead-collecting cloth is mounted in such a way as to be able to control its inclination. It may likewise be mounted in such a way as to be able to control its distance with respect to the drawing-out drum.

The invention also has for its object, when the fibers of material must be deposited on a conveyor for the formation of a mat thereon, to proceed with this deposition by means of a distributor constituted by two articulated elements, one above the other. The fibers move against the lower surface of these elements under the action of a gas current which advantageously may be the same as that which served to apply the fibers against the periphery of the drawing-out drum. The extremity of the outlet of the distributor sweeps the surface of the travelling conveyor transversely over all or part of its width, while the two elements of the distributor are pivoted about their joint. The length of the travel remains substantially constant in such a way that the inlet velocity of the air and of the fibers on the cloth is substantially constant.

Thus, there is obtained a very uniform distribution of fibers on the conveyor and consequently a very homogeneous screen or sheet.

The invention also provides for utilizing two or more distributors which are supplied separately with fibers and which are disposed one after the other in the direction of displacement of the feed mechanism in order to obtain a screen of any desired thickness. These different distributors can be set in motion in synchronism with each having the same amplitude. They may also have the same amplitude and not be synchronized, each having a different frequency with respect to one another.

Other objects and purposes of the invention will be evident from the description which follows in conjunction with preferred embodiments which are illustrative thereof but non-limiting.

In this description, reference is made to the attached drawings wherein

FIG. 1 is a side view of a device for manufacturing and removal of fibers;

FIG. 2 is a perspective view of a part of this device;

FIGS. 3 to 5 are front views of the device showing three different adjustments thereof whereby three widths of bands of fibers may be obtained thereby;

FIG. 6 is a corresponding front view of the device when it is adjusted to obtain a wick of fibers;

FIG. 7 is a perspective view of a device for protecting the filaments or threads during their travel from the spinning nozzle or drawing plate to the drawing-out drum;

FIG. 8 is a perspective view of a chamber for equalizing pressure between the spinning nozzle and drum;

FIG. 9 is a vertical sectional view of the device shown in FIG. 8;

FIGS. 11 and 12 are perspective views of details of the device shown in FIG. 10;

FIG. 13 is a perspective schematic view of an apparatus according to the invention for producing fiber screens or sheets;

FIG. 14 is a side view of one embodiment of the apparatus;

FIG. 15 is a perspective view of the apparatus shown in FIG. 14;

FIG. 16 is a side view of a duplex device for depositing a screen or sheet on a single support;

FIGS. 17 and 18 are detailed views of the jointed members designed to distribute the fibers to form a screen, FIG. 17 being a view of an enlarged scale of that portion of the distributor in the vicinity of the pivoted joint between the members; and FIG. 19 is a plan view of installation composed of several of the devices for the formation of a screen or sheet.

Figure 10:
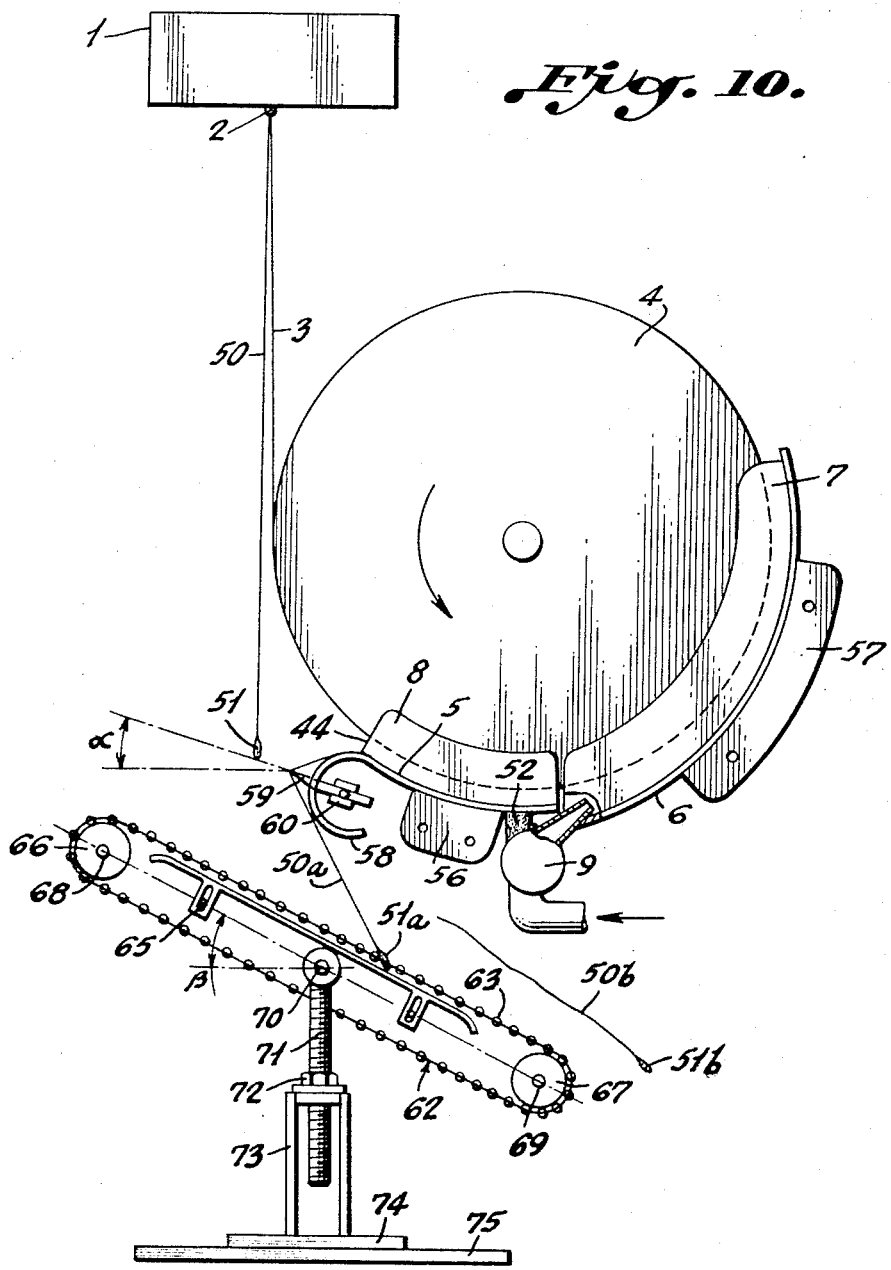
FIG. 10 is a side view of a device for starting of the filaments of material on the drawing-out drum.

In FIG. 1 is shown the spinning nozzle or drawing plate 1, generally of platinum or an alloy of platinum, with its teats or nozzle openings 2 and the glass filaments 3 issuing therefrom. The drawing-out drum 4, of a length greater than that of the spinning nozzle 1, is adapted to rotate in the direction of arrow F. The speed of rotation of the drum 4 may, for example, be about 1000 r.p.m. which corresponds to a drawing-out speed of about 40 m./sec. The drawing-out drum is preferably of a length approximately 60% greater than that of the spinning nozzle. The drawing-out drum is driven by an electric motor, not shown, fitted with a progressive change of speed.

On one part of the periphery of the drum, and extending over about one third of this periphery, are provided two guide elements 5 and 6, of generally cylindrical outline, with enveloping edges 8 and 7, respectively. The guide elements 5 and 6 may be mounted movably in order to be able to regulate the space which separates them from the drum.

In the space left free between the guide elements, there is placed a nozzle 9 for introducing a gaseous current between the guide element 6 and the surface of the drum. This current of gas gives rise to a zone of reduced pressure upstream, that is to say, between the guide element 5 and drum and therebeyond, in consequence of which the filaments 3 can be brought into contact with the drum. This same gas current applies the filaments of material against the drum and assures their entrainment by the latter, which thus draws out these threads into filaments.

A deflecting plate 10 constituted by a rectangular flat plate, changes the direction of the air leaving the duct formed by drum 4 and the guide element 6. The fibers drawn along by centrifugal force and by the swerving current of air, are detached from the drum before they can come into contact with the lower edge of plate 10.

In order that the fibers may be removed under the best conditions, from an aerodynamic point of view, it is necessary that the deflecting plate 10 form an angle comprised within certain limits with the plane passing through the axis of the drum. If this angle is too small, eddies are produced having a troublesome influence on the distribution of the fibers. If, on the other hand, it is too large, the filaments are removed, not by the air, but by the edge of the deflecting plate 10, which is thus subjected to wear, necessitating its adjustment during operation. Practically, this angle should be between 30° and 60°. The length of the deflecting plate 10 must exceed that of the drum on both sides, and its height is advantageously about half the diameter of the drum, so that the current of air which is produced corresponds perfectly to the laws of aerodynamics, to enable the fibers to be removed perfectly from the drawing-out drum 4.

A counter-deflecting plate 11 follows guiding element 6 and cooperates with deflecting plate 10. Plate 11 is fixed on all sides to supports for the deflecting plates, not shown, and the distance which separates it from deflecting plate 10 is adjustable. Its role consists principally in imparting an acceleration to the air and thereby to give thereto the energy necessary for the transport of the fibers.

The counter-deflecting plate 11 is preferably formed of a flexible material, such as, for example, the material known commercially under the name of "Plexiglas." Under the action of the gaseous fluid it assumes a slightly incurved shape to obtain a suitable increase in the acceleration of the latter.

Lateral shutters or shields 12 and 13 (FIGS. 1 to 6), are attached to the counter-deflector 11 by means of fastening straps 14. The distance which separates these shutters from the counter-deflector 11 is adjustable. The adjustment of this distance may be executed manually or else mechanically with the aid of any suitable means.

FIGS. 3 to 5 show the shutters 12 and 13 of the counter-deflector in three different positions. In FIG. 3, the distance of shutters 12 and 13 from the counter-deflector is large; in FIG. 4, the spacing is moderate, and in FIG. 5 the shutters are substantially adjacent to the edges of plate 11.

As seen in FIG. 3, the ribbon formed by fibers 17 spreads out widely, the fibers being distributed over the entire width of the guiding or distributing member 15 which is located above deflector 10. The width of this guiding member may be regulated by displacement of its lateral parts 16 according to the width of the ribbon obtained. Fibers 17 are thus distributed uniformly over the width of the guiding or distributing member 15 and produce a very homogeneous screen or mat, even in the case of very high speed of the conveyor cloth, not shown, serving as a place of deposit for the fibers. This is explained by the fact that the air coming from the duct formed by the drawing-out drum 4 and the guide element 6 can escape laterally between the deflector 10 and the counter-deflector 11. Shutters 12 and 13 of the counter-deflector thus regulate the quantity of air which escapes. The width of the mat of fibers can be much higher, for example 20%, than the length of the drawing-out drum.

In FIG. 4, shutters 12, 13 of the counter-deflector are shown in an intermediate position. Fibers 17 come onto the guiding or distributing member and are again spread out, however, in a lesser measure than in the preceding case. The width of the mat or pad of fibers may be equal to the length of the drum, this ribbon being very much wider than the original width of the deposit of filaments on the drum. This position of shutters 12, 13 of the counter-deflector permits the production of homogeneous screens at normal speeds of the conveyor cloth.

In FIG. 5, shutters 12 and 13 are located very close to counter-deflector 11. The air can no longer escape through the two sides of counter-deflector 11, and consequently fibers 17 can no longer spread out laterally so that they are deposited on the guiding or distributing organ 15 without dispersion or spreading. Shutters 12 and 13 do not necessarily have to be parallel to the exterior edges of the counter-deflector 11, but may form an angle with these edges, as shown in FIG. 6. Thus, there can be obtained a particularly narrow ribbon of fibers, or even a core or wick. In this way, it is possible, for example, to reinforce a screen already formed or in process of formation on a conveyor cloth by bringing to it a narrow, supplementary fiber ribbon extending essentially in a single direction.

It is evidence from the preceding description that it is possible, through cooperation of deflector 10, counter-deflector 11 and the two shutters 12 and 13 of the counter-deflector, to produce fibers forming a sheet of quite variable width, capable of going as far as forming a wick. It is also possible to obtain fibers of any desired length by regulating the flow of air by means of these members.

Member 15 may conduct the fibers to a distributor or it may itself constitute the distributor member which conducts the fibers onto a frame such as a conveyor cloth or an assembly station, where they are deposited in forming a screen or mat.

FIG. 7 shows a device which permits the elimination of lateral eddies of air during the travel of the filaments of material between the spinning nozzle and the drawing-out drum.

This device comprises a wall 20 and two lateral plates 21 extending perpendicularly thereto. Wall 20 extends from the drawing plate or spinning nozzle 1 up to drum 4, with which it forms only a very small gap, which may be less than one millimeter. The lateral plates 21 extend from the lower edge of wall 20 as far as the entrance of the intake duct 22. These lateral extensions are movable in a vertical direction, and may be fixed at 23.

The upper part 24 of wall 20 is made of refractory material, for example, of asbestos. This part protects the teats or openings of the spinning nozzle against outside influences. The atmosphere around the openings being made very calm as a result of this device, the tailings of filaments which hang from beads in case of rupture, remain vertical.

FIGS. 8 and 9 show a pressure compensating chamber between spinning nozzle 1 and drawing-out drum 4.

This chamber is constituted by a channel of rectangular section formed by front and rear walls 30, 31 and lateral walls 32, 33. Wall 31 may be of transparent material, for example, glass. It may be lifted, or opened by means of a hinge, in order to supervise the conditions of re-priming or re-starting.

In these figures, a filament of material 3 is shown carried along by the drawing-out drum 4, and a tail 34 as a continuation of a drop or bead 35. The filament 3, as shown, is wound on the drum 4, in normal fashion.

The chamber is divided into three zones I, II and III by screens or diaphragms 36 and 37, perforated at their center in order to permit the passage of filaments of material. Openings 38 in the walls of the chamber are provided at the upper part of zone II and are fitted with shutters 39 whose inclination may be regulated.

Lateral walls 32 and 33 extend towards the bottom of parts 40–41 which end a short distance from drum 4 upstream of the guiding element 5. The lower part of the chamber is open at 42 to permit evacuation of induced air, which is indicated by arrows 45 (FIG. 9), and the elimination of beads or drops of glass.

Zone I is closed to prevent escape of heated air in the vicinity of the spinning nozzle or drawing plate.

Regulation of the quantity of air which enters into zone II through openings 38, as indicated by arrows 45, in consequence of the induction of air through intake duct 44, is obtained by means of shutters 39. The current of air in this zone II is adjusted to a very low flow value. This current is laminar, the same as in zone III, and the latter, extends to the entrance of the intake channel. This regulation of the flow of air allows obtaining a system of flow in which the aerodynamic pressures in zone I are compensated. The result is that the tails of the beads or drops remain motionless and melt under well determined conditions.

FIG. 10 shows an embodiment of the invention designed for priming or starting the filaments of material onto the drawing-out drum 4. As described above, guide elements 5 and 6 with lateral screens 8 and 7, respectively, cooperate with the drum. In this figure is shown a filament of material 3 started on the drum, a filament of material 50 which must be started on the drum and which follows a bead 51, which in falling carries along the filament.

The compressed air nozzle 9 discharges the air into the duct formed by the guide element 6 and its lateral screens 7, and a sealing joint 52 is provided so that the outer air cannot enter except through the intake slot 44. The nozzle may move in the direction of its height and along its longitudinal axis in order to be able to occupy the most favorable position for priming and drawing-out. This nozzle, which extends over the entire length of the drawing-out drum, is divided into several compartments 53 (FIG. 12). Its upper part pivots on hinges 54 so that the velocity of escaping air can be adapted to working conditions, for example, to the peripheral speed of the drawing-out drum. The speed of the discharging air must be greater than the peripheral speed of the drum, so that the thread may adhere well to the drum. By virtue of the division of the air nozzle into several compartments 53, it is possible to attain identical conditions insofar as concerns the air over the entire length of drum 4.

As may be seen in FIG. 11, the air ducts formed by plates 5 and 6 and their lateral flanges 8 and 7, are made air tight by sealing joints 55 provided between the flanges 8 and 7 and the drum 4. The devices 56 and 57 for affixing the guide elements are shown in FIG. 10.

A knife 59 is mounted on the forward part of guide element 5, which is provided with a rounded part 58. This mounting includes a device 60 which permits the knife to be moved longitudinally and angularly in such a way as to vary at will the space which separates the knife from the filament, and the angle α of its accurate and proper inclination. Experience shows that the cut is best when the knife contacts the filament perpendicularly to the knife. The extremity 58 of plate 5 is rounded and preferably polished to permit the filament to slide easily during priming and separation of the thread from the bead.

The belt 62 for collecting the beads is constituted by a succession of bars 63 forming a ribbon, the upper strand of this cloth moving above a plate 64. This plate is mounted by means of devices 65, which permits a fine adjustment of the space which separates it from belt 62. Precise adjustment of this space is important because bars 63 of belt 62 placed above plate 64 must grasp the beads at their center of gravity. If the space is too narrow the bead slides on a bar 63. It is then entrained only slowly, and consequently is not carried along at the necessary speed for priming to enable the cut to be made correctly. If the space is too large, the bead is not seized by the bars, or is not seized at its center of gravity, and priming cannot take place correctly. Of course, it may happen from time to time that the bead falls on a bar without coming in contact with plate 64. In this case, the bead is not seized at its center of gravity, but experience has shown that this happens very rarely in practice and that the priming of the thread is not disturbed.

The spacing of the bars 63 of belt 62 also has a great influence on the quality of priming. This spacing must be selected in such a way that, in falling, the bead passes across bars 63 and is received by plate 64. If this separation is too small, the bead slides on the bar and is ejected only very slowly. If it is too large, the bead strikes plate 64 violently, and there can be produced in return a shock in the filament in the direction of the teat or opening in the spinning nozzle, which may damage the nearby filaments. In addition, the priming, under these conditions, is not effected correctly. Thus, as tests have shown, the ejection of the bead takes place correctly when the bars 63 are displaced 10 to 30 mm., and preferably about 20 mm.

The belt of metallic bars 62 passes over two cylinders 66 and 67 rotating on axes 68, 69, respectively. It is actuated by an electric motor, not shown, which drives cylinder 67 by means of a suitable transmission. This motor is preferably mounted under belt 62 so as to be able to follow all the movements of the latter.

The bead-collecting belt 62 with its sheet metal plate 64 is pivotally mounted at 70 to impart the necessary inclination so that angle β between the belt and the falling bead has the desired value. In order to obtain the maximum effect of the belt, this angle β must be of a predetermined value. If it is too large, the bead will not be correctly ejected because it will slide on the bars. If it is too small, the thread will receive a shock which will be transmitted to the teat opening in the spinning nozzle, and may damage the nearby filaments. Tests have established that priming takes place correctly when the assembly of the bead-collecting belt 62 and plate 64 is inclined from 20° to 35°, and preferably about 26°, to the horizontal.

The bead-collecting belt is also movable vertically by means of a spindle 71 and a screw 72 mounted on a support 73. This arrangement permits adjustment of the advance of the length of the thread to be cut. Support 73 is fastened to a plate 74 which in turn is affixed to base plate 75 by means of screws. The two plates are fixed by screws penetrating into button hole cuts so that the assembly of bead-collecting belt 62 and plate 64 may be moved with respect to the drawing-out drum 4, whereby the same may be positioned more of less close to it.

The automatic priming or starting develops as follows: The drop or bead of glass 51 carries along with it, when it falls, a thin filament 50, passes very close to drawing-out drum 4, and falls on plate 64 above which moves the belt with metallic bars 62. The bead is seized at its center of gravity by the first bar 63 encountered, and it is carried along violently and ejected in the direction of displacement of the belt (position 51a). Filament 50a, which the bead carries along after it, is thus conducted to the drum and started thereon. Perfect starting of the filament is attained by the suction existing at the inlet of the air duct formed by drum 4 and guide plate 5, this suction being effected by the compressed air nozzle 9 and by the rotation of the drum. At the moment when the bead is ejected, the filament is separated from the bead 51b and from the undesirable swollen part of the thread 50b by knife 59, located on the plate of guide 5 and more particularly on the rounded edge 58 of this latter. In this way the starting of the filaments on the drum is effected correctly and the intrusion of the beads of material and other imperfections in the finished product, such as portions of thicker thread, which would lower its quality, is thus avoided.

FIG. 13 shows schematically an apparatus according to the invention for the formation of sheets or mats on a conveyor belt.

The sheet of parallel fibers emerging between plates 10 and 11 with the width determined by lateral shutters 12 and 13, is carried along by the air current and proceeds to apply itself against the interior surface of a guide element 80 formed by a curved wall 81 and two side walls 82. A second guide element 84, also formed by a curved wall 85 and side walls 86, is articulated at 83 to guide element 80.

Guide element 82 is articulated about an axis 87, and guide element 84 is mounted on a shaft 88 provided with rollers 89 rolling on rails 90. A double-acting jack 91 actuates shaft 88 back-and-forth. This movement has the effect of opening or closing progressively the compass constituted by guide elements 80 and 84.

Guide element 84 discharges on a conveyor belt 92 above a chamber 96 under low pressure which is connected by a duct 93 to a vacuum source. This endless conveyor passes over rollers 94, 95, one of which is actuated.

The fibers, carried along on the inner wall of guide elements 80 and 84 by the air current, are deposited on belt 92 in forming a screen or mat 97, the width of which is equal to the amplitude of the back-and-forth movement of the extreme edge 98 of the curved wall 85 of guide element 84. It is apparent that whatever the span or opening of the compas formed by guide elements 80 and 84, the course travelled by the fibers is constant, which causes a uniform deposit of fibers and consequently a screen or mat of constant thickness over its entire width.

FIGS. 14 and 15 show detailed views of the assembly of a machine in accordance with the invention. A source of supply for calcined glass is furnished by hopper 101, which is mounted on a support 104 and which may be regulated in height. A damper plate 105, fitted with an actuating rod 102, is guided by guide-pieces 106, 107, and a feed tray for the calcined glass is mounted on rollers which roll on rails 122. The feeding of the calcined glass is controlled by means of an electric motor 110 with a continuous speed changer, and a chain sprocket 113 and a link chain 112 connected to the output of the speed changer casing. A fly-wheel 109 permits manual control of the advancing speed of the feed tray 107. The feed tray is actuated by means of a bar 115 which is joined to an eccentric plate 114 mounted on sprocket 113. The eccentric plate is provided with circular bores at different distances from its center in order to regulate the length of travel of the feed tray 107. This assembly is mounted on a support 117.

The calcined glass discharged from the feed tray is conducted to the drawing plate or spinning nozzle 1 through a guiding funnel or hopper 111.

The chamber of the spinning nozzle 1, in which the calcined glass is melted, as well as the heating transformer, are suspended from iron bars 118 mounted, like support 117, on a frame 119 attached to uprights 261 of the framework of the apparatus. This suspension is assured by rods 120 affixed to brackets 125 integral with the spinning nozzle and by iron channel bars 126. The length of the suspension rods 120 may be regulated by means of threaded screws and nuts 121. Rubber buffer pads 123 assure the damping of the vibrations caused by the rotation of drum 4 rotating at high speed.

A front protecting wall 128 and two side walls 129 of transparent material such as "Plexiglas" are provided adjacent to the spinning nozzle 1. The upper part 127 of walls 128 and 129 is of asbestos. This protecting wall is mounted on a corner angle iron 263. Walls 129 are adjustable in height.

The shaft of the drawing-out drum 4 is mounted on bearings 131 and a brake-drum 133 is provided at its extremity with a brake band 132 which is actuated by lever 134. This braking member is mounted at 135 on a crossbar 264. Rotation of the drum 4 is assured by means of a pulley fixed on its axis and actuated by a band 137 which is driven from a regulating pulley 136 which in turn is actuated by belt 147 driven by an electric motor 138. Regulating pulley 136 is constituted by two movable discs joined together by a spring which permits continuous regulation of the speed of the drawing-out drum.

The motor 138 and its transmission are mounted on a rocking plate 140. This plate is hinged on a stirrup support 141 integral with a frame 146, and at its other extremity it is mounted in articulated fashion on a forked piece 144 by a threaded rod 143 controlled by an adjusting wheel 142, this rod 143 being itself articulated on a support 145 integral with frame 146. The latter is supported by uprights 278, which like uprights 261 are integral with the framework 265 of the machine.

In FIGS. 14 and 15 is shown the bead-collecting belt 62 with its plate 64 whose height can be regulated by means of irons 150. This belt passes over a loose pulley 66 and a pulley 67 at the opposite end which is driven by an electric motor 156 through the intermediary of a belt 154. The assembly of the motor and bead-collecting belt is mounted on a support 157 which is itself pivotally mounted on axis 153 of supporting bracket 158. This arrangement permits the bead-collecting belt to have the desired inclination.

The assembly of the compressed air nozzle 9 is supplied by flexible tubes 160 connected at 159 to the outlet of the ventilator. Adjusting screws 163 serve to regulate the inclination of the blast pipe assembly. Butterfly valves 164 are provided in the nozzle 9 and they themselves permit the regulation of the passage of air in each part of the blast pipe.

Supports 57 of guide element 6 are mounted at their upper part on an articulated rod 165 seated on brackets 178 which are fixed to uprights 261 by means of bolts passing into threaded bores. The supports 57 are mounted at their lower part on small connecting rods 173 articulated on a rod 174 so as to permit regulation of the distance of the guide element with respect to the drum. Rod 174 is mounted at both extremities on small plates 175 whose height can be adjusted by screws which engage in holes of said plates and which screw onto uprights 261.

The counter-deflector 11 is fastened on angle irons 180. Attaching members 181 maintain the shutters 12 and 13, cooperating with deflector 10 and counter-deflector 11, in adjustable position by means of screws and threaded openings.

As may be seen in detail in FIGS. 17 and 18, guide elements 80 and 84 are hinged together at 83 and include a plate 193 of flexible material extending through a slot 188 in the former, and a plate 194 of compressible material, particularly of spongy resin, between the overlapping parts of the guide elements. A tightness in the junction zone of said elements is achieved thereby.

The lateral parts 82 of guide element 80 are attached rigidly to flat irons 195 which are mounted on shaft 87 which is rotatably mounted on bearings 198 which are fixedly mounted on uprights 261. Shaft 88 is mounted on flat iron pieces 202 which are integral with the lateral parts 86 of the second guide element 84. Rollers 89 mounted on the opposite ends of shaft 88 roll on rails 90, and rod 206 of hydraulic jack 207 is connected at 205 to shaft 88. This jack is attached by piece 208 to a support 209 on which are also attached crosspieces 270 and 271. Oil conduits 210 and 211 are provided for the operation of the jack. In order to provide for the limits of travel, the machine includes a cam or finger 212 which is adapted to cooperate with a cam or finger 213 controlling an electro-valve 218 and a cam or finger 214 controlling an electro-valve 217. A hydraulic valve 215 serves to regulate the speed of displacement of the hydraulic jack towards the rear and a hydraulic valve 216 itself regulates the speed of displacement of said jack in a forward direction.

The machine also comprises an oil duct or tube 220 for supplying the jack and a return duct 221, which are mounted on oil distributor 219. The oil supply is furnished by an oil reservoir 222 fitted with a pressure regulator 223, and with the help of an oil pump 224 operated by an electric motor 225. Current supply of the electro-valve 217 and 218 is obtained by a low-voltage rectifier 226.

The endless conveyor belt 92, which is permeable to air, travels between rollers 94 and 95, between which are arranged roller supports 239, and on return rollers 241 and 276. Rollers 94 and 95 as well as intermediate rollers 239 are mounted rotatably in bearings 246 and 247 mounted on a frame 273 which is supported by uprights 272. Bearings 277 of the lower rollers 276 are mounted directly on iron pieces 275 which also support the assembly for supplying the hydraulic jack 207. A device for adjusting the tension of the conveyor belt 92 is provided by a threaded rod 242 engaging a threaded bore in a piece 243 and which is integral with a regulating screw 245. This threaded rod 242 displaces a slide 244 on which is mounted the bearings 246 of roller 94.

Suction box 96, which is provided under the upper flight of the conveyor belt, comprises air guide plates 228 and shutters 230 allowing regulation of the section of the surface subjected to suction effects. These shutters are controlled by levers 231 and 234. There are also provided adjusting shutters 232 controlled by a lever, not shown, and a damper 236 which serves to regulate the quantity of air aspirated.

Roller 95, assuring the travel of the conveyor belt 92, is controlled by gears 250 and 253 and chain 252 extending therebetween. Gear 253 is operated by an electric motor 256 through the intermediary of a variable speed reducer 255.

FIG. 16 shows an arrangement according to which two distributor units, constituted respectively of elements 80, 84 and 80a, 84a, receive the fibers coming from spinning nozzles 1, 1a and drawing-out drums 4, 4a. These distributor units are actuated simultaneously by the same double-acting jack 207, and deposit the fibers on the same endless conveyor belt 92.

FIG. 19 is a schematic view of an installation assembly comprising several spinning nozzles 1, 1a and distributing units 80, 84 and 80a, 84a, arranged successively along the length of a traveling conveyor for depositing the fibers on the same conveyor belt 92. The pad of fibers thus obtained is sized at A, and then passes into an oven B, from which it is discharged for cutting and winding at station C.

I claim:

1. In combination with a supply of molten thermoplastic material wherefrom a plurality of closely spaced molten streams issue in parallel relation and solidify in the course of their dropping movement to form a row of a plurality of parallelly arranged fibers,
    (a) means for drawing out and collecting said fibers for the production of a mat therefrom, comprising
    (b) a drawing-out drum below said supply, and rotatable about a substantially horizontal axis displaced from said row of fibers at such a distance as to bring the lateral surface of said drum into approximately tangential relation to said fibers,
    (c) means for generating a reduced pressure zone at one radial sector of the drum below said point of tangency to aspirate the fibers into contact therewith,
    (d) means for generating a positive pressure zone at a subsequent radial sector of the drum, in the direction of rotation thereof, to engage the fibers with the drum for the entrainment thereof along a portion of the periphery thereof,
    (e) means beyond said pressure zone for pneumatically guiding away the parallelly arranged fibers from the drawing-out drum, and
    (f) means cooperating with said last-mentioned means for controlling the width of the band of parallel fibers withdrawn from said drum.

2. An apparatus for manufacturing fibers of thermoplastic material derived from thin closely-spaced molten streams which solidify in the course of their dropping towards a drawing-out station, comprising a rotary drawing-out drum at said station, arcuate guide means spaced from the periphery of said drum for forming an air duct adjacent to a portion of the periphery of said drum, a blower nozzle cooperating with said guide means for creating a zone of low pressure adjacent to the path of the fibers dropping past said drum for inducing the fibers into said duct and into contact with said drum to effect the entrainment thereof and a zone of high pressure beyond said zone of low pressure to press the fibers into engaging contact with said drum to assure the entrainment thereof, a channel beyond said arcuate guide means adjacent to the drum and in communication with said air duct for pneumatically guiding away the fibers from said drum in substantial parallelism, and means for adjusting said channel and the consequent air-flow therethrough for varying width of the band of fibers passing from said drawing-out drum.

3. An apparatus as set forth in claim 2 wherein said arcuate guide means extends along the lower portion of the drawing-out drum substantially concentrically therewith and terminates below the top of the drum, and said channel beyond said guide means is formed by a deflector plate extending radially and upwardly from the periphery thereof, a counter-deflector plate disposed oppositely thereto, and adjustable lateral shutters cooperating with the opposite edges of the latter to control the air-flow through said channel.

4. An apparatus as set forth in claim 3 wherein said arcuate guide means include two substantially cylindrical sectors, each provided with lateral flanges overlying the ends of the drawing-out drum, adjustable mounting means therefor, and said blower nozzle being disposed between said sectors to direct compressed air into said duct in the direction of the discharge end thereof.

5. An apparatus as set forth in claim 4 wherein said blower nozzle extends substantially along the entire length of the drawing-out drum with transverse partitions in said nozzle to subdivide said nozzle into a plurality of compartments, and separate air inlets for said compartments.

6. An apparatus as set forth in claim 5 wherein the blower nozzle includes a hinged wall to regulate the exit orifices, whereby the velocity of the air escaping therefrom is higher than the peripheral velocity of the drawing-out drum, and means for mounting said blower nozzle adjustably both angularly and in elevation to control the air current passing through said duct.

7. An apparatus as set forth in claim 3 wherein said deflector plate is flat and extends beyond the ends of the drawing-out drum, at an angle of approximately 45° to the tangent plane whereat said deflector plate extends from the periphery of said drum, and said counter-deflector plate is formed of flexible material, with adjustable mounting means therefor to impart a convexity thereto so that the resultant convergent passage results in an acceleration of the air flow and the more ready withdrawal of the entrained fibers from the drawing-out drum.

8. An apparatus as set forth in claim 7 including means for adjusting the lateral shutters cooperating with the opposite edges of the counter-deflector for angular movement with respect to said edges, to render them convergent, thereby to confine the fibers issuing from the channel into the form of a wick.

9. An apparatus as set forth in claim 7, including means for adjusting the lateral shutters cooperating with the opposite edges of the counter-deflector for parallel movement with respect to said edges.

10. An apparatus as set forth in claim 2 including a drawing plate from the orifices of which flow the closely-spaced molten streams of fibers, said drawing-out drum having a length approximately 60% greater than that of the drawing plate.

11. An apparatus as set forth in claim 10 including a protective chamber between the orifices of the drawing plate and the inlet of the air duct adjoining the drawing-out drum, said chamber having a front wall and lateral walls extending perpendicularly thereto substantially up to the forepart of the arcuate guide means, said chamber functioning as a pressure-compensation chamber.

12. An apparatus as set forth in claim 11 wherein said protective chamber is of rectangular cross-section provided with spaced apertured partitions to subdivide the chamber into at least three superposed zones, the apertures permitting the streams of molten material to drop therethrough, a lining of refractory material in the uppermost zone adjacent to the drawing plate so that any broken streams are adapted to be melted at this point, the upper part of the zone below said uppermost zone having openings therein with adjustably inclined shutters cooperating therewith, and the lowermost zone at the bottom of the protective chamber having an opening therein to permit the evacuation of induced air and the discharge of the solidified beads therefrom.

13. An apparatus as set forth in claim 2 including means for starting a fiber onto said drawing-out drum which has missed the drawing-out station, said means comprising an endless conveyor belt below said drawing-out drum for seizing a solidified bead and the filament trailing it, cutting means in advance of said arcuate guide means for severing the filament as the same is pulled against said cutting means by the trapped bead traveling on said belt preparatory to its projection therefrom together with the enlarged part of the filament adjacent thereto, while the newly cut end of the filament is aspirated into the air duct beyond said cutting means for contact with the drawing-out drum for entrainment thereby.

14. An apparatus as set forth in claim 13 wherein said endless conveyor belt comprises a plurality of transversely disposed bars displaced from each other in the direction of movement of said conveyor, and a rigid plate below the upper flight of said conveyor belt at a predetermined adjustable distance therefrom.

15. An apparatus as set forth in claim 14, wherein the displacement between the transversely disposed bars are adapted to range between 10 mm. and 30 mm., a support, pivotal mounting means thereon for said endless conveyor belt, and means on said support for adjusting the height and the inclination of said conveyor belt below said drawing-out drum.

16. An apparatus as set forth in claim 15 including means for driving said endless conveyor belt at a lineal velocity lower than the peripheral velocity of the drawing-out drum.

17. An apparatus as set forth in claim 13 wherein said cutting means comprises a cutting knife, means including a rounded edge extending from the forepart of said arcuate guide, means for adjustably mounting said cutting knife on said guide for protrusion beyond said rounded edge to guide the free end of the filament into the air duct immediately beyond said rounded edge.

18. An apparatus as set forth in claim 2 including means for depositing the fibers issuing from the discharge channel onto a travelling conveyor for the formation of a mat of fibers, said means comprising a movable distributor formed by a pair of articulated arcuate guide elements pivotally joined to each other at the midportion of the distribution, said arcuate elements being hood-shaped to guide the fibers along the inner surface thereof by the action of the gaseous current conveying the fibers for deposition onto said conveyor as the discharge edge of said distributor alternately sweeps across the width of said conveyor.

19. An apparatus as set forth in claim 18 wherein the articulated arcuate guide elements are each formed by a curved plate with downwardly extending flanges on the opposite edges thereof, means for pivotally mounting one end of one of the guide elements above the outlet of the channel conveying the fibers from the drawing-out drum, rollers connected to the other one of the elements and guide tracks cooperating therewith, a double-acting jack for moving said second guide element to alternately expand and contract the span encompassed by said distributor as the same deposits the fibers onto said travelling conveyor.

References Cited

UNITED STATES PATENTS

| | | | |
|---|---|---|---|
| 2,838,879 | 6/1958 | Schuller | 65—10 |
| 2,987,761 | 6/1961 | Schuller et al. | 65—4 |
| 2,996,102 | 8/1961 | Schuller | 65—9 |
| 3,220,811 | 11/1965 | Schuller | 65—9 |
| 3,228,067 | 1/1966 | Strang et al. | |

DONALL H. SYLVESTER, *Primary Examiner.*

ROBERT LINDSAY, JR., *Assistant Examiner.*

U.S. Cl. X.R.

65—4, 9, 11